(No Model.)
S. HARDLEY.
SEED DISTRIBUTER.
No. 592,629. Patented Oct. 26, 1897.
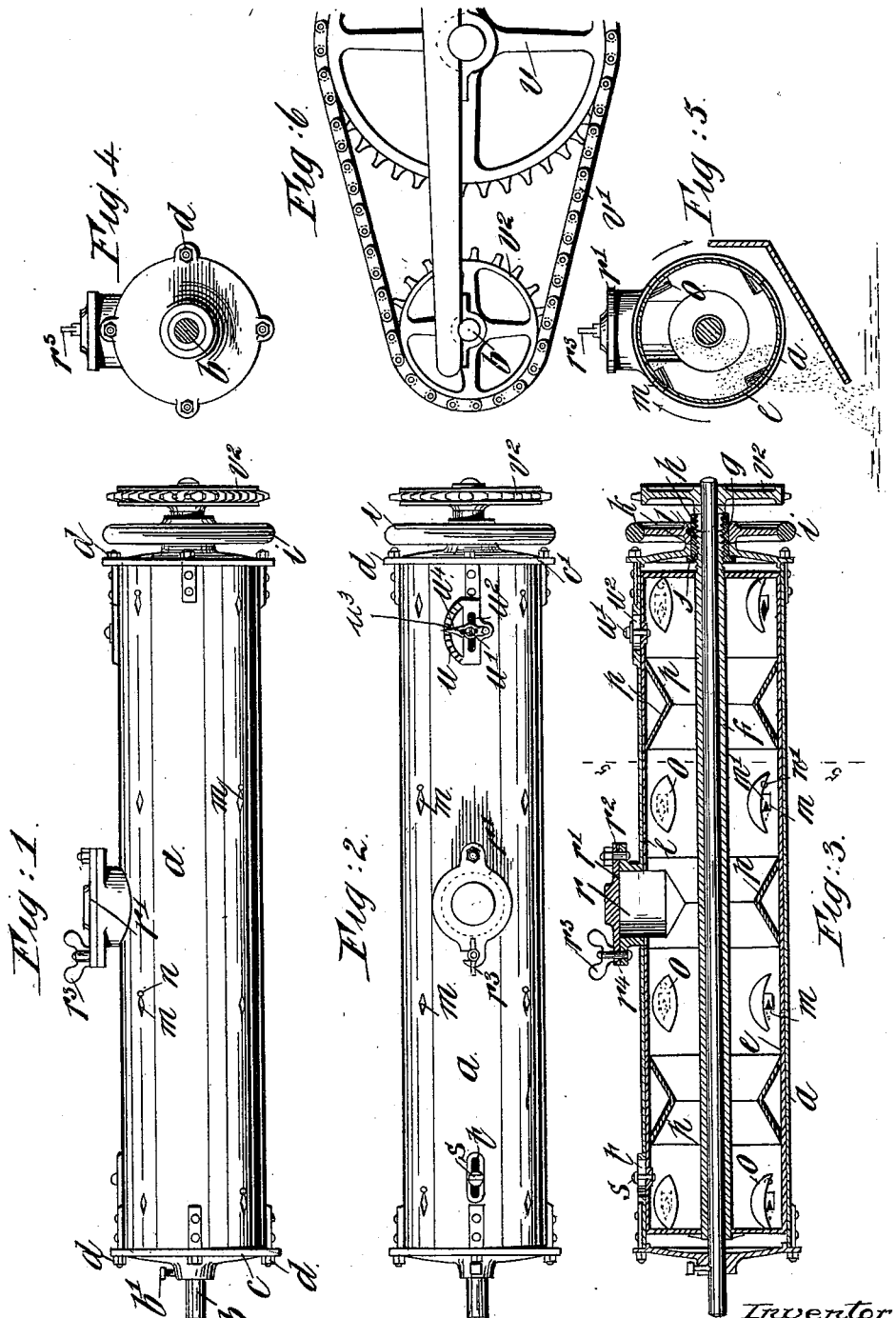
Attest
James M. Shea
Wm. F. Hall
Inventor
Samuel Hardley
by Richards &co
Attys.

UNITED STATES PATENT OFFICE.

SAMUEL HARDLEY, OF CHRISTCHURCH, NEW ZEALAND.

SEED-DISTRIBUTER.

SPECIFICATION forming part of Letters Patent No. 592,629, dated October 26, 1897.

Application filed October 30, 1896. Serial No. 610,594. (No model.) Patented in New Zealand August 10, 1896, No. 8,796; in New South Wales September 21, 1896, No. 6,913; in Victoria September 22, 1896, No. 13,519; in South Australia September 24, 1896, No. 3,414; in England October 20, 1896, No. 23,295, and in Canada October 28, 1896, No. 54,002.

*To all whom it may concern:*

Be it known that I, SAMUEL HARDLEY, farmer, a subject of the Queen of Great Britain, residing at 71 Cathedral Square, Christchurch, in the Provincial District of Canterbury, in the Colony of New Zealand, have invented a new and useful Seed-Distributer, of which the following is a specification.

The invention has been patented in New Zealand, No. 8,796, dated the 10th day of August, 1896; in Great Britain, No. 23,295, dated the 20th day of October, 1896; in Canada, No. 54,002, dated the 28th day of October, 1896; in Victoria, No. 13,519, dated the 22d day of September, 1896; in South Australia, No. 3,414, dated the 24th day of September, 1896, and in New South Wales, No. 6,913, dated the 21st day of September, 1896.

This invention relates to means employed for distributing seeds, and provides a simple apparatus for the purpose which may be attached to a roller, colter-drill, harrow, or other implement.

It consists of a metallic cylindrical casing which is journaled and revoluble by sprocket or other gearing from a land or carrying wheel of the implement upon which it is employed.

The casing is mounted at right angles to the path of the implement and is provided with a number of holes arranged at regular intervals around its periphery and throughout its length. A second cylinder fitting within the casing referred to and revoluble with it is provided with holes corresponding in position with the holes in the outer casing and provided with means whereby it may be moved longitudinally to adjust the size of the holes therein or to close them altogether, if desired.

Seed—such as turnip, clover, or grass—to be distributed is placed within the inner cylinder through an opening provided for the purpose, and when the apparatus is revolved the seed is sown "broadcast," or, if desired, delivered into colter-tubes.

I will more particularly describe my invention by the aid of the accompanying drawings, in which—

Figure 1 is a side elevation; Fig. 2, a plan; Fig. 3, a longitudinal central section; Fig. 4, an end view; Fig. 5, a transverse section on line 5 5 of Fig. 3, and Fig. 6 a side elevation showing a mode of operating the apparatus.

The cylindrical metallic casing $a$ is secured upon the shaft $b$ by the set-pin $b'$ in the boss of the disk plate $c$, which forms a cover for the casing and is secured thereto by bolts $d$. The inner cylinder $e$ fits within the outer casing and is secured upon a tube $f$, surrounding a shaft $b$ and provided with a screwed end $g$, taking into a nut $h$ in the operating-wheel $i$. The nut $h$ is held in position by a flange $j$ upon one side of the cover $c'$ and by the boss $k$ of the wheel $i$, in which it is secured by a pin $l$. Holes $m$, preferably of a diamond shape, with a small circular hole $n$ for small seeds at one point of the diamond, are provided at regular intervals in the casing $a$, and holes $m'$, corresponding in position, but preferably rectangular in shape, and small circular holes $n'$, corresponding with the holes $n$, are formed in the inner cylinder to correspond with the similarly-shaped holes in the outer casing. By turning the operating-wheel the tube carrying the inner cylinder is moved longitudinally upon the spindle $b$ and the size of the holes $m$ regulated or the small holes in the inner and outer cylinder brought into correspondence, as desired.

Semicircular cups $o$, fixed upon the inner periphery of the cylinder $e$ around each of the holes therein, are designed to carry seed and prevent the holes from choking from overpressure. Rings $p$, formed of sheet metal and V-shaped in section, are fixed within the cylinder $e$, dividing it longitudinally into compartments, whereby the seed is deflected toward the cups as the cylinder revolves.

A circular opening $r$ for admission of seed is closed by the cover $r'$, pivoted upon a pin $r^2$ and secured by a wing-nut $r^3$ upon a screw-pin $r^4$, taking into a jaw formed upon the cover.

Studs $s$ and $u^r$, secured upon the inner cylinder, take into slots $t$ and $u^2$ in the outer casing, insure that they revolve together and maintain the cylinder in position within the casing, so that the holes with which they are respectively provided are in line.

A semicircular index-plate $u$ is fixed to the outer casing, and the stud $u'$, fixed to the inner cylinder working in the slot $u^2$ in the casing, engages with a slot $u^3$ in the pointer $u^4$, which is pivoted at one end, its opposite end traveling over the index-plate and indicating the relative positions of the cylinder and casing and consequent size of the apertures through which the seed passes.

In operation the distributer is revolved in the direction of the arrow, Fig. 5, from a sprocket-wheel $v$ upon the axle of the implement, connected by the chain $v'$ with a sprocket-pinion $v^2$ on the shaft $b$. Seed placed within the cylinder alternately falls into and out of the cups $o$ as the apparatus revolves, a certain quantity, according to the nature of the seed, being delivered through the holes when they respectively arrive at about the position shown in Fig. 5.

What I claim as my invention, and desire to secure by Letters Patent, is—

1. A seed-distributer comprising the inner and outer cylinders fitting one within the other and having coinciding openings, means for adjusting one cylinder longitudinally within the other to vary the size of the openings, and means for preventing the independent rotation of the cylinders, substantially as described.

2. A seed-distributer comprising the supporting-shaft, the outer cylinder carried thereby, and having discharge-openings, the tube adjustably mounted on the shaft, and the inner cylinder carried by said tube and having discharge-openings corresponding to the openings in the outer cylinder, substantially as decribed.

3. A seed-distributer comprising the inner and outer cylinders having corresponding discharge-openings, means for adjusting said cylinders relative to each other to vary the size of the openings, and the deflectors carried by the inner cylinder between the openings, substantially as described.

4. A seed-distributer comprising the inner and outer cylinders having corresponding openings, means for rotating said cylinders, means for adjusting said cylinders longitudinally of each other to vary the size of the openings, means for preventing the independent rotation of the cylinders, and the interior annular double-faced deflectors carried by the inner cylinder between the discharge-openings, substantially as described.

5. A seed-distributer comprising the shaft with means for rotating it, the tube mounted thereon, the inner perforated cylinder carried by said tube, the collar threaded upon the end of the tube, the outer perforated cylinder connected to the shaft at one end and supported by said collar at the other end, and means for turning said collar to adjust the cylinders longitudinally of each other, substantially as described.

6. In combination with the outer cylinder having discharge-openings, the inner cylinder adjustably held therein and having corresponding discharge-openings, and the inclined feed-cups adjacent to said openings, substantially as described.

7. In combination, the outer cylinder having discharge-openings, the inner cylinder longitudinally adjustable therein and having corresponding discharge-openings, means for adjusting said inner cylinder longitudinally, the scale carried by the outer cylinder, the pin carried by the inner cylinder and projecting through an opening in the outer cylinder, and the pointer carried by said pin, substantially as described.

Dated this 27th day of August, 1896.

SAMUEL HARDLEY.

Witnesses:
 HENRIE H. RAYWARD,
 W. CUMING CLARK.